(12) United States Patent
Varughese et al.

(10) Patent No.: US 10,877,537 B1
(45) Date of Patent: Dec. 29, 2020

(54) MANAGING ELECTRICAL POWER DELIVERY TO A PERIPHERAL DEVICE IN A VEHICLE

(71) Applicant: Denso International America, Inc., Southfield, MI (US)

(72) Inventors: Sibu Varughese, Sterling Heights, MI (US); Christopher Abrego, Novi, MI (US); Martin Nespolo, Grosse Pointe Woods, MI (US); Gareth Webb, New Hudson, MI (US)

(73) Assignee: Denso International America, Inc., Southfield, MI (US)

( * ) Notice: Subject to any disclaimer, the term of this patent is extended or adjusted under 35 U.S.C. 154(b) by 7 days.

(21) Appl. No.: 16/448,783

(22) Filed: Jun. 21, 2019

(51) Int. Cl.
| | |
|---|---|
| *G06F 1/26* | (2006.01) |
| *G06F 1/3203* | (2019.01) |
| *H02J 7/02* | (2016.01) |
| *G06F 13/10* | (2006.01) |
| *B60R 16/023* | (2006.01) |
| *B60K 6/28* | (2007.10) |

(52) U.S. Cl.
CPC .......... *G06F 1/266* (2013.01); *B60R 16/0231* (2013.01); *G06F 13/102* (2013.01); *B60K 6/28* (2013.01); *B60Y 2200/91* (2013.01); *B60Y 2200/92* (2013.01)

(58) Field of Classification Search
CPC .......... G06F 1/26; G06F 1/266; G06F 1/3203; G06F 1/3206; G06F 13/102; H02J 7/0021; H02J 7/0032; H02J 7/0027; H02J 7/0036; H02J 7/0068; H02J 7/007; B06R 16/0231
See application file for complete search history.

(56) References Cited

U.S. PATENT DOCUMENTS

| | | | |
|---|---|---|---|
| 8,143,842 B2* | 3/2012 | Tyler | B60L 53/34 320/104 |
| 8,312,299 B2* | 11/2012 | Tremel | G06F 1/3296 713/300 |
| 9,142,065 B2 | 9/2015 | Rude et al. | |
| 9,527,478 B2 | 12/2016 | Flick | |
| 9,531,312 B2 | 12/2016 | Hirasawa et al. | |
| 9,634,491 B2 | 4/2017 | Robinson et al. | |
| 9,802,504 B2 | 10/2017 | Jones et al. | |
| 9,831,672 B2* | 11/2017 | Luh | G06F 1/26 |
| 2014/0058762 A1 | 2/2014 | Rude et al. | |
| 2019/0041940 A1 | 2/2019 | Lota | |

* cited by examiner

*Primary Examiner* — An T Luu

(74) *Attorney, Agent, or Firm* — Christopher G. Darrow; Darrow Mustafa PC

(57) ABSTRACT

System, methods, and other embodiments described herein relate to managing electrical power delivery to a peripheral device in a vehicle. In one embodiment, a method includes, receiving, at a vehicle-side controller via a communication channel, a request from the peripheral device to modify the electrical power delivery to the peripheral device. The method includes, in response to identifying that the request is for an increase to the electrical power delivery, determining an electrical loading of the vehicle. The method also includes communicating a message over the communication channel to the peripheral device that causes the peripheral device to manage the electrical power delivery according to whether the electrical loading satisfies a loading threshold of the vehicle.

20 Claims, 6 Drawing Sheets

MANAGING ELECTRICAL POWER DELIVERY TO A PERIPHERAL DEVICE IN A VEHICLE

TECHNICAL FIELD

The subject matter described herein relates in general to systems and methods for managing electrical power in a vehicle, and, more particularly, to processing power requests from devices connected to the vehicle.

BACKGROUND

Manufacturers are designing vehicles with increasing access to electrical power in and around the vehicle. What was once an electrical socket for "wirelessly" lighting cigars and cigarettes is now evolving into numerous electrical outlets for supplying power to different types of peripheral devices. Consumer demand for electrical outlets to supply power to these devices drives the number of the outlets manufacturers are designing into vehicles. The utility of the vehicle usually dictates how many and where a designer places power outlets. For example, lower cost vehicles may have one or more outlets in a front passenger area, such as a 12 Volt DC accessory outlet (e.g., cigarette lighter receptacle), and one or more universal serial bus (USB) charging ports. In most cases, as the sticker price of the vehicle increases, so does the number of the outlets. Both DC and AC electrical outlets are found throughout the vehicle, such as an entire passenger compartment, inside and outside of a truck bed, in a trunk, in an engine compartment, etc.

More and more peripheral devices are finding their way into the vehicle and require electrical power to operate. The ease of accessibility to the electrical outlets, in effect, promotes the usage of peripheral devices. Furthermore, autonomous vehicles, mobility service providers like to provide more time to passengers for in-vehicle work activities, entertainment, etc., which in turn can increase the number of peripheral devices to support these functions. As such, conditions may emerge when providing the necessary power to one or more of these devices giving rise to various difficulties as outlined. The various difficulties may involve degraded system performance that leads to operational challenges in the power delivery system of the vehicle.

SUMMARY

In one embodiment, example systems and methods associated with managing electrical power delivery to a peripheral device in a vehicle are disclosed. As previously noted, ease of access to electrical outlets throughout the vehicle promotes the use of peripheral devices. With the number of electrical outlets and outlet types (e.g., DC, AC, USB, etc.) increasing both inside and outside of the vehicle, so are the number of sufficiently mobile peripheral devices that can be powered by the vehicle. However, the electrical loading of a power delivery system of the vehicle may be disrupted when excessive power is being supplied to one or more peripheral devices. Disturbances in the power supplied by the power delivery system may lead to, for example, engine idle speed fluctuations and voltage variations causing vehicle loads to switch off.

Therefore, in one embodiment, a vehicle-side controller communicates with the peripheral device to actively modify the electrical power delivery from the vehicle. Requests from the peripheral device may be, in one embodiment, for an increase, a decrease or a termination of power delivered to the peripheral device. In response to the request, for example, for an increase in electrical power, the vehicle-side controller may verify the electrical loading of the power delivery system before allowing the peripheral device to draw the requested increase. Depending upon the electrical loading, the vehicle-side controller, in one embodiment, communicates a message over a communication channel to the peripheral device that causes the peripheral device to configure itself to draw the increase in requested power. Alternatively, in one arrangement, the vehicle-side controller communicates the message that includes a denial to the request for the increase. In this case, the message indicates, for example, a wait time before the peripheral device can request the increase again. With this approval process, the vehicle may prepare for additional electrical loading and can improve control of the power delivery system to minimize external power disturbances from peripheral devices.

In one embodiment, a vehicle-side controller for managing electrical power delivery to a peripheral device in a vehicle is disclosed. The vehicle-side controller includes one or more processors and a memory that is communicably coupled to the one or more processors. The memory stores an evaluation module including instructions that when executed by the one or more processors cause the one or more processors to receive, via a communication channel, a request from the peripheral device to modify the electrical power delivery to the peripheral device. The evaluation module includes instructions to, in response to identifying that the request is for an increase to the electrical power delivery, determine an electrical loading of the vehicle. The memory stores a communication module including instructions that when executed by the one or more processors cause the one or more processors to communicate a message over the communication channel to the peripheral device that causes the peripheral device to manage the electrical power delivery according to whether the electrical loading satisfies a loading threshold of the vehicle.

In one embodiment, a method for managing electrical power delivery to a peripheral device in a vehicle from a vehicle-side controller is disclosed. The method includes receiving, at the vehicle-side controller via a communication channel, a request from the peripheral device to modify the electrical power delivery to the peripheral device. The method includes, in response to identifying that the request is for an increase to the electrical power delivery, determining an electrical loading of the vehicle. The method also includes communicating a message over the communication channel to the peripheral device that causes the peripheral device to manage the electrical power delivery according to whether the electrical loading satisfies a loading threshold of the vehicle.

In one embodiment, a method for managing electrical power delivery to a peripheral device connected with a power delivery system in a vehicle is disclosed. The method includes determining power attributes for operating the peripheral device and current attributes of electrical power being delivered to the peripheral device over the power delivery system. The method includes transmitting a signal to a vehicle-side controller over a communication channel requesting a modification to the current attributes as a function of the power attributes in relation to the current attributes. The method also includes, in response to one or more communications from the vehicle-side controller indicating adjustment attributes for selectively modifying the current attributes, executing one or more power management functions that change the current attributes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
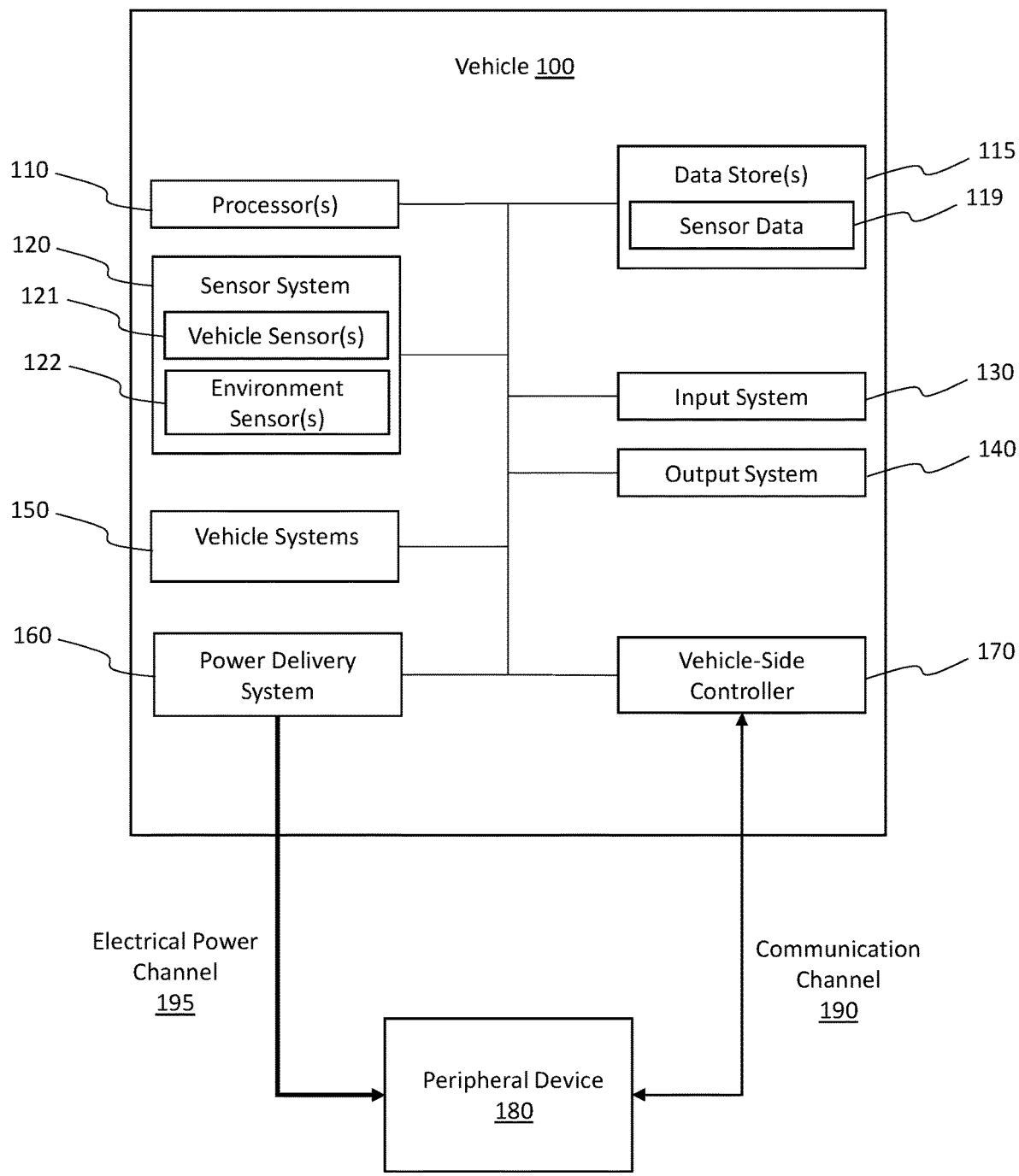
FIG. 1 illustrates one embodiment of a vehicle in which example systems and methods disclosed herein may operate.

Systems, methods, and other embodiments associated with managing electrical power delivery to a peripheral device in a vehicle are disclosed. As previously suggested, the wide variety of available electrical outlets in the vehicle make it easier to provide power to all sorts of peripheral devices. The peripheral devices may include, for example, electronics (e.g., laptop, GPS unit, DVD player, etc.), consumer appliances (e.g., refrigerator, electric heater, crock pot, hair dryer, microwave oven, etc.), electric tools, battery chargers, and so on. Problems may arise when an electrical loading of one or more peripheral devices becomes large enough to affect a power delivery system of the vehicle. The problems may include, for example, engine idle speed fluctuations and substantial variations in a system voltage of the power delivery system. Large enough decreases or "dips" in the system voltage (e.g., 1 Volt, 3 Volts, 5 Volts, etc.) may result in triggering a threshold where vehicle loads are switched off.

Furthermore, the electrical outlets may remain active and available to supply power even when an engine is off. This condition may lead to depleting energy storage devices of the vehicle. Other than being fused to protect against a rated current, electrical power delivery is typically not monitored at each of the electrical outlets. Power consumed by the peripheral devices may be inferred by monitoring the power delivery system of the vehicle. The lag time associated with the vehicle reacting to the peripheral device electrical loading may be a leading cause of the engine idle speed fluctuations and substantial system voltage variations mentioned above.

Therefore, in one embodiment, a system includes a vehicle-side controller communicably coupled with the peripheral device via a communication channel. The vehicle-side controller manages electrical power delivery to the peripheral device. The peripheral device is electrically connected to the power delivery system of the vehicle and communicates requests over the communication channel. The vehicle-side controller can receive a request from the peripheral device to modify the electrical power delivery to the peripheral device. The peripheral device, in one approach, requests an increase to the electrical power delivery. The vehicle-side controller, in response to the request for the increase, evaluates an electrical loading of the vehicle to determine whether to allow the increase in power from the vehicle. Depending upon the electrical loading satisfying a loading threshold, the vehicle-side controller, in one arrangement, communicates a message to the peripheral device that specifies a partial or a full acceptance of the increase is available. Accordingly, in one aspect, the message causes the peripheral device to manage the electrical power delivery by executing one or more power management functions that change the electrical power delivery to the peripheral device.

The vehicle-side controller can determine, for example, that the request for the increase of the electrical power delivery to the peripheral device does not satisfy the loading threshold. In this case, the vehicle-side controller communicates the message that specifies various denials of the increase. For example, the message can specify that the peripheral device waits for a period of time before requesting the increase to the electrical power delivery. As another example, the message can specify that the peripheral device holds off and wait until further notified by the vehicle-side controller. Stating the denials in the message, in one arrangement, cause the peripheral device to maintain the current electrical loading from the power delivery system of the vehicle instead of increasing an electrical load. In this way, the system manages the electrical power delivery to the peripheral device so that the vehicle can better control the power delivery system and minimize variations in idle speed, and system voltage variations.

Furthermore, the vehicle-side controller can identify that the request from the peripheral device to modify the electrical power delivery is a decrease to the electrical power delivery. In this instance, the vehicle-side controller communicates the message to initiate the decrease to the peripheral device that reduces the electrical power delivered at a ramp-down rate. Electrical transients in a vehicle electrical system have a negative impact on the performance of electronic components. By controlling the ramp-down rate, transients from abruptly switching off inductive loads may be reduced. Additionally, the system may operate more efficiently knowing in advance that power is either being decreased or removed from the power delivery system. This is especially true when the system is managing multiple peripheral devices.

Referring to FIG. 1, an example of a vehicle 100 is illustrated. As used herein, a "vehicle" is any form of powered transport. In one or more implementations, the vehicle 100 is an automobile, for example, a vehicle including an internal combustion engine, a hybrid electric vehicle (HEV), a purely electric vehicle (EV), a plug-in hybrid electric vehicle (PHEV), etc. While arrangements will be described herein concerning automobiles, it will be understood that embodiments are not limited to automobiles. In some implementations, the vehicle 100 may be any other form of motorized transport that, for example, allows access to a power delivery system 160 of the vehicle 100 for managing electrical power delivery to a peripheral device, and thus benefits from the functionality discussed herein.

The vehicle 100 also includes various elements. It will be understood that in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a power delivery system 160 that functions to deliver electrical power to various electrical power consumers in the vehicle 100. The peripheral device, as described herein, is considered an electrical power consumer when connected to the power delivery system. For example, the power delivery system 160 supplies electrical power to the peripheral device 180 via an electrical power channel 195, as shown in FIG. 1. The electrical power channel 195 may be, for example, a wire, cable, etc., and may include an in-line fuse. The power delivery system 160 is, in one embodiment, an electrical power bus that provides voltage and current in various forms to the electrical power consumers. In one approach, the power delivery system 160 includes one or more energy storage devices and/or fuel cell systems to supply power to the electrical power bus. Alternatively, or in addition to, the power delivery system 160 includes an alternator used to generate power for the electrical power consumers. The electric power may be supplied by various types of power supplies and/or generators on the vehicle 100.

The power delivery system 160 may include electrical conversion devices connected between sources of the electrical power and the electrical power consumers. For example, the electrical conversion devices may include converters, inverters, and generators. The electrical conversion devices may condition the electrical power such that appropriate power levels and power types are available at electrical outlets in the vehicle 100, e.g., 5 VDC, 12 VDC, 120 VAC, 240 VAC, etc. If the power delivery system 160 includes a high voltage battery, for example, a traction battery to supply power to an electrified powertrain, high voltage may be available to high voltage power consumers via the appropriate electrical outlet, e.g., 100 VDC, 200 VDC, 300 VDC, etc.

The electrical power consumers within the vehicle 100 may be selectively switched off by the power delivery system 160 depending on an electrical state of the vehicle 100. For example, the electrical state may include a voltage level of the power delivery system 160. If the voltage level were to drop below a threshold voltage, e.g., 11 Volts, 10 Volts, 9 Volts, 8 Volts, etc., the power delivery system 160, in efforts to conserve power, may turn off large electrical loads or restrict large loads from turning on. Instead of switching off the power consumer, the power delivery system 160 may limit the power to the power consumer when the threshold voltages are exceeded. In this case, the power delivery module may limit a current to one or more power consumers. The power delivery system 160 may prioritize which electrical power consumers are switched off, e.g., air conditioning seats may be switched off before the air conditioning compressor. The power delivery system 160 may not be able to switch some electrical power consumers off. For example, the power delivery system 160 may not be able to turn off the electrical outlets that supply the electrical power to the peripheral device 180 unless, e.g., an ignition system of the vehicle 100 is switched off by a driver.

The electrical power consumers within the vehicle 100 may be, for example, actuators, sensors, controllers, electrical motors, compressors, pumps, etc. Furthermore, one or more peripheral devices 180 may be connected to the vehicle 100 at any time. Power consumption by the peripheral device 180 and how it interfaces to the vehicle 100 will be described in greater detail below.

The vehicle 100 includes a vehicle-side controller 170 that functions to manage the electrical power delivery to the peripheral device. The peripheral device 180 communicates with the vehicle-side controller 170 via a communication channel 190, as discussed further below. In one or more arrangements, the peripheral device 180 is a smart device capable of requesting power from the vehicle-side controller 170. The vehicle-side controller 170 may selectively allow the peripheral device 180 to draw the requested power or deny the request according to the electrical loading of the power delivery system 160. Moreover, while depicted as a standalone component, in one or more embodiments, the vehicle-side controller 170 is integrated with the power delivery system 160, or another component of the vehicle 100. The noted functions and methods will become more apparent with a further discussion of the figures.

The vehicle-side controller 170, in one or more arrangements, is configured to communicate with the peripheral device 180 through the communication channel 190. The communication channel 190, in one or more approaches, includes at least one of a wired medium, a wireless medium, and a fiber-optic medium (i.e., optical fiber,). The wired medium may include a vehicle controller area network (CAN) bus; a local interconnect network (LIN), an on-board diagnostic (OBD) connector, a universal serial bus (USB), one or more wires, or the like. Communication utilizing the wireless medium may include networking technologies, such as cellular, Bluetooth®, Wi-Fi, etc. Alternatively, the vehicle 100 and the peripheral device 180 may be configured to communicate via powerline communication (PLC) techniques (not shown). In this case, the communication channel 190 and the electrical power channel 195 are the same and communication between the vehicle-side controller 170 and the peripheral device 180 occurs over the electrical power channel 195 that also functions as the communication channel. For example, in one approach, both the peripheral device 180 and the vehicle-side controller 170 include transceivers allowing bidirectional communication over the electrical power channel 195.

Figure 2:
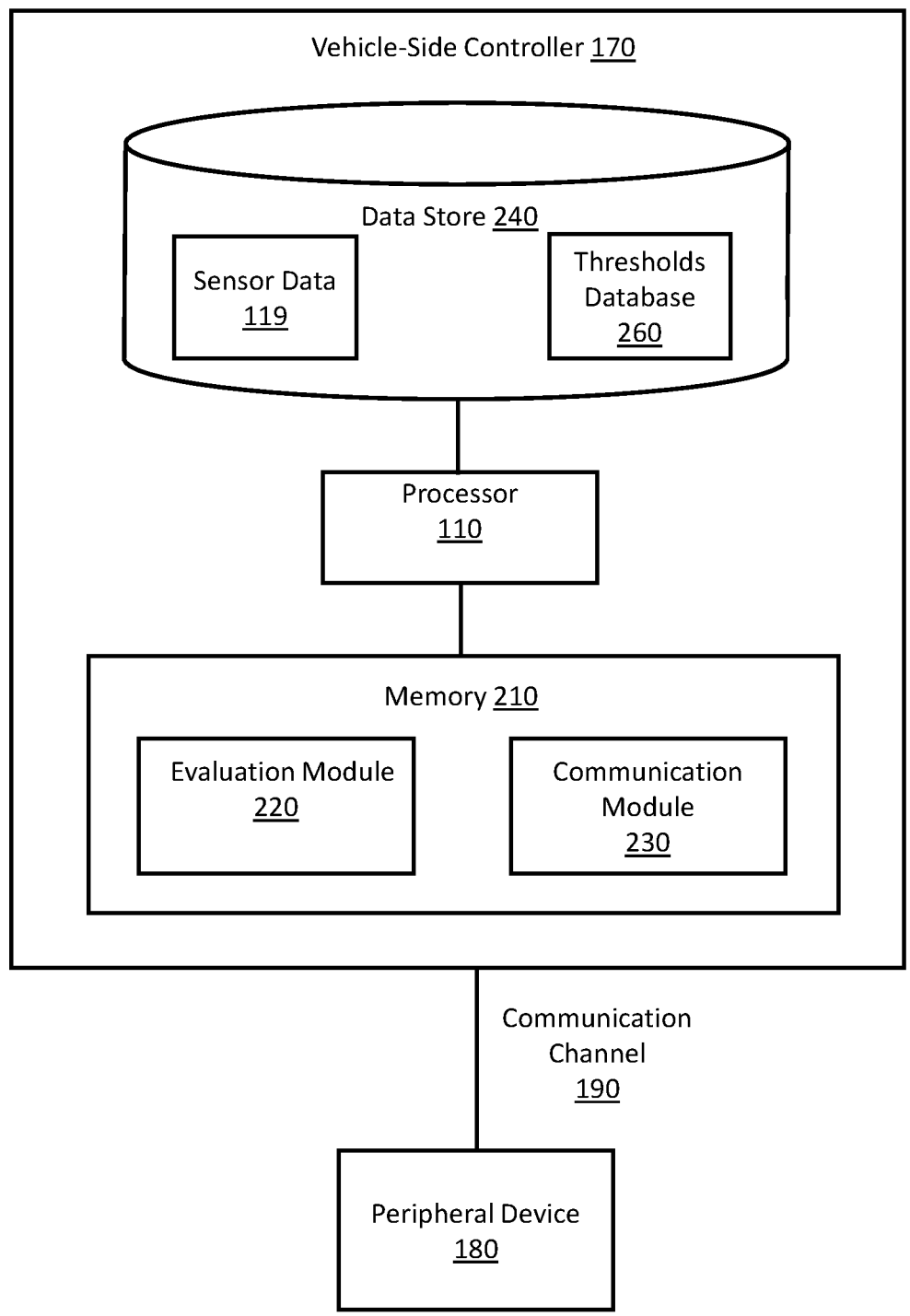
FIG. 2 illustrates one embodiment of a vehicle-side controller that is associated with managing electrical power delivery to a peripheral device.

With reference to FIG. 2, one embodiment of the vehicle-side controller 170 is further illustrated. The vehicle-side controller 170 is shown as including a processor 110 from the vehicle 100 of FIG. 1. Accordingly, the processor 110 may be a part of the vehicle-side controller 170, or the vehicle-side controller 170 may include a separate processor from the processor 110 of the vehicle 100. Further, the vehicle-side controller 170 may be configured to access the processor 110 through a data bus or another communication path. In one or more embodiments, the processor 110 is an application specific integrated circuit that is configured to implement functions associated with an evaluation module 220 and a communication module 230. In general, the processor 110 is an electronic processor such as a microprocessor that is capable of performing various functions as described herein.

In one embodiment, the vehicle-side controller 170 includes a memory 210 that stores the evaluation module 220 and the communication module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers) for independently performing the noted functions.

Furthermore, in one embodiment, the vehicle-side controller 170 includes a data store 240. The data store 240 is, in one embodiment, an electronically based data structure for storing information. For example, in one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 119 and a thresholds database 260 along with, for example, other information that is used by the modules 220 and 230.

Accordingly, the evaluation module 220 includes instructions that function to control the processor 110 to receive, via the communication channel 190, a request from the peripheral device 180 to modify the electrical power delivery to the peripheral device 180. In some instances, the request is for an increase to the electrical power delivery for proper operation of the peripheral device 180. For example, if the peripheral device 180 is a mini-refrigerator connected to a 120 VAC electrical outlet inside the vehicle 100, the mini-refrigerator may determine that the temperature is too high and sends a request to the evaluation module 220 for an increase in power for appropriately powering the compressor of the mini-refrigerator. The peripheral device 180 may determine that it no longer needs power or that the peripheral device 180 can operate in a lower power mode. In this case, the peripheral device 180 may send a request that is identified by the evaluation module 220 as a decrease to the electrical power delivery. The request for the decrease to the electrical power delivery is a condition that is handled by the communication module 230 and described in detail below.

In one or more arrangements, the evaluation module 220 identifies the request as an increase or a decrease to the electrical power delivery. In one approach, the evaluation module 220 identifies the received request as an increase to the electrical power delivery. The request from the peripheral device 180 may include a requested power value representative of the increase to the electrical power (e.g., 1 Watt, 10 Watts, 100 Watts, etc.). Additionally, the request may include a power time representative of when the requested power is needed (e.g., immediately, in 1 second, in 5 seconds, etc.). In general, the request includes, for example, pertinent information that assists the evaluation module 220 in evaluating the electrical power delivery to the peripheral device. Furthermore, the peripheral device 180 may need to transition from an off state to an on state, for example, during a power-on condition. In this case, the electrical power consumed by the peripheral device 180 is initially zero. The request for the increase would include enough power to transition the peripheral device 180 to the on state.

The evaluation module 220, in one embodiment, includes instructions to, in response to identifying that the request is for an increase to the electrical power delivery, determine an electrical loading of the vehicle 100, i.e., of the power delivery system 160. In one embodiment, the evaluation module 220 includes instructions to analyze observations of a voltage and a current of the power delivery system 160. That is, the evaluation module 220 may acquire data from one or more sensors (e.g., vehicle sensor(s) 121) of the vehicle 100 that form the sensor data 119. In general, the sensor data 119 includes information that embodies observations of an electrical state of the power delivery system 160. Thus, the observations embodied in the sensor data 119 can include observations of, for example, the voltage across the power delivery system 160 and the current delivered by the power delivery system 160. From the voltage and the current, the evaluation module 220, in one arrangement, determines the electrical power, i.e., an electrical power level, being delivered by the power delivery system 160. The electrical power level is representative of the electrical loading of the power delivery system 160. As set forth below, the electrical loading of the power delivery system 160 is considered when determining whether the request for the increase in electrical power delivery to peripheral device 180 is allowed. The evaluation module 220 may store a value of the electrical loading in the thresholds database 260. The electrical loading may be updated every time there is a request for an increase to the electric power delivery.

The evaluation module 220, in one embodiment, determines a loading threshold. The loading threshold may be based at least in part on an electrical power limit of the power delivery system 160. As set forth below, the loading threshold, in one arrangement, is an electrical power level that is used by the vehicle-side controller 170 to determine whether the increase in electrical power delivery requested by the peripheral device 180 is allowed. The thresholds database 260 may store, for example, the threshold voltages at which the power delivery system 160 begins to selectively switch off the electrical power consumers, as set forth above. The evaluation module 220 may utilize the threshold voltages to determine the electrical power limit. The electrical power limit may be an electrical power level below which the power delivery system 160 begins to conserve power and starts to switch-off the electrical power consumers selectively.

In one approach, the electrical power limit includes a power buffer value to establish the loading threshold. The power buffer value is, for example, a power level value that the thresholds database 260 stores and the evaluation module 220 uses to provide a sufficient margin of power to the electrical power limit. The evaluation module 220 may use the power buffer value to account for the requested power value, tolerances, in-rush current, etc. For example, the power buffer value may simply be the requested power value. As another example, the power value includes the requested power value and an error value indicative of a maximum variability in the requested power value. The evaluation module 220 may determine the power buffer value using various approaches and store the power buffer value in the thresholds database 260. The vehicle-side controller may also store other thresholds in the thresholds database 260 for use by the evaluation module 220 in determining the electrical power limit. For example, the thresholds may be threshold currents, threshold powers, etc. In any event, the evaluation module 220 may utilize threshold values to determine the electrical power limit, and thus the loading threshold.

As another example, the electrical power limit may be an absolute power level, below which the power delivery system 160 may not support additional loading from peripheral device 180. For example, the thresholds database 260 stores, in one approach, an electrical power limit value that corresponds to the power delivery system 160 that is experiencing heavy loading. For example, the power delivery system 160 may become heavily loaded when a substantial amount of vehicle loads are activated, and the vehicle 100 is climbing a steeply graded hill. Accordingly, the evaluation module 220 may add the power buffer value to the electrical power limit value to establish the loading threshold that corresponds to the heavily loaded power delivery system 160.

The evaluation module 220 includes instructions to determine when an internal combustion engine of the vehicle 100 is in an off state. In this case, the evaluation module 220 may determine the loading threshold based at least in part on the engine being in the off state. The engine may be in the off state for many reasons. For example, the vehicle 100 may include an engine start/stop system where the engine automatically turns off when the vehicle 100 is stopped at a stop sign or a light. The engine would subsequently start when the driver requests power by engaging the accelerator. As another example, the engine may be in the off state and the ignition system may be active, e.g., in an accessory state, causing the power delivery system 160 to deliver electrical power to the appropriate electrical power consumers. In either case, the evaluation module 220 may determine that the engine is in the off state, for example, from the power delivery system 160, from one or more vehicle systems 150, etc.

The starter draws significant power from the power delivery system 160 when starting the engine, for example, 2000 Watts, 2400 Watts, 2700 Watts, etc. To reserve sufficient power to start the internal combustion engine, the evaluation module 220 may assign significant weight to the starter when determining the electrical power limit and thus the loading threshold. Accordingly, the evaluation module 220 may obtain a starter power load value from the thresholds database 260 and add the starter power load to the electrical power limit when the engine is in the off state. This burden may be realized by the peripheral device 180 when requesting power while the engine is off. In other words, there is more of a chance that the vehicle-side controller 170 may deny the request for the increase in electrical power delivery when the engine is in the off state.

It should be appreciated that just because the peripheral device 180 was allowed to draw electrical power when the engine was in an on state doesn't necessarily mean that the peripheral device 180 will not be affected when the engine transitions to the off state. For example, the engine may be in the off state for an extended period of time while the driver is listening to the radio. The peripheral device 180 may also be drawing electrical power during this time. As discussed further below, the vehicle-side controller 170 may determine from the evaluation module 220 that the electrical loading has exceeded the electrical power limit and the power buffer value that is added to the electrical power limit. In this case, the vehicle-side controller 170 may instruct the peripheral device 180 to, for example, stop drawing electrical power, i.e., shut itself off. If more than one peripheral device 180 is drawing power during this time, the evaluation module 220 may prioritize which of the one or more peripheral devices 180 will be instructed to turn off. The evaluation module 220 may receive a priority list from an input system 130 of the vehicle 100, e.g., a touch display, microphone, a mobile device of an owner of the vehicle 100, etc. In one or more approaches, the evaluation module 220 receives the priority list and/or a peripheral ranking value from the one or more peripheral devices 180 via the communication channel 190.

With further reference to the communications and the communication channel 190, in one embodiment, the communication module 230 includes instructions that function to control the processor 110 to communicate a message over the communication channel 190 to the peripheral device 180. Furthermore, the message causes the peripheral device 180 to manage the electrical power delivery according to whether the electrical loading satisfies a loading threshold of the vehicle 100. That is, the evaluation module 220 receiving the request from the peripheral device 180 for an increase to the electrical power delivery triggers the communication module 230 to compare the present electrical loading with the loading threshold. In response to the electrical loading satisfying the loading threshold, for example, the communication module 230 communicates the message to the peripheral device 180 that causes the peripheral device 180 to manage the electrical power delivery in order to draw the requested power value. Other outcomes are possible, as described below. The loading threshold may not be satisfied. In this case, the message may, for example, specify a hold command to wait until further notified to request the increase again.

The loading threshold may be satisfied when the value of the present electrical loading has a power level greater than the loading threshold, i.e., the electrical power limit plus the power buffer value. The loading threshold may still be satisfied when the electrical loading dips below a summation of the electrical power limit and the power buffer value. For example, the loading threshold may be satisfied if the loading threshold is between the summation and the electrical power limit for a predetermined minimum time, e.g., 250 milliseconds, 500 milliseconds, 1 second, etc. The communication module 230 may use any suitable metric involving the electrical power limit and the power buffer value to determine if the loading threshold is satisfied.

When the loading threshold is satisfied, the communication module 230, in one arrangement, includes instructions to generate the message to specify either a partial acceptance that a percentage of the increase is available, or a full acceptance of the increase is available. In the case of the partial acceptance, the message may include the percentage of the increase, i.e., the percentage of the requested power value, that is allowable immediately. The evaluation module 220 may determine, for example, that the present electrical loading that includes the requested power value would place the electrical loading below the power buffer. The evaluation module 220 may determine the appropriate percentage to the requested power value that keeps the present electrical loading above the summation of the electrical power limit and the power buffer. In the case of the partial acceptance or the full acceptance, the message may indicate a time delay value that signifies a delay time that causes the peripheral device 180 to manage the electrical power delivery after the delay time.

The message specifying the partial acceptance or the full acceptance, in one arrangement, causes the peripheral device 180 to manage the electrical power delivery. Specifically, this message, in one arrangement, further causes the peripheral device 180 to respond by executing the percentage of the increase, i.e., the percentage of the requested power value, from the power delivery system 160. In the case of the message specifying the full acceptance, this causes the peripheral device 180 to respond by executing one hundred percent of the requested power value from the power delivery system 160.

The message specifying a partial acceptance may include a percentage value that is zero percent. By using zero percent as the percentage value, the vehicle-side controller 170 can indicate to the peripheral device 180 to stop drawing power. When the communication module 230 communicates the message that specifies a partial acceptance of zero percent, the electrical power delivery may be managed by the peripheral device 180 such that it switches itself off.

In one arrangement, the communication module 230 includes instructions to, when the loading threshold is not satisfied, generate the message to specify at least one of a wait time for requesting the increase again, and a hold command to wait until further notified to request the increase again. The message specifying the wait time or the hold command, in one arrangement, causes the peripheral device 180 to respond by maintaining a present electrical loading from the power delivery system 160. Other suitable messages from the communication module 230 may cause the peripheral device 180 to maintain a present electrical loading.

The evaluation module 220 implements the wait time/hold command to abate continually servicing requests that may result in decreased computational efficiency. The evaluation module 220 may determine the wait time or a notification time from, for example, the electrical loading of the power delivery system 160, the number of peripheral devices 180 in communication with the evaluation module 220, whether the engine is in the off state, etc. In the case of the message specifying the hold command, the evaluation module 220 may indicate to the communication module 230 to generate a notification message specifying requests are allowable after the notification time. As an example, the message specifying the wait time may be used by the vehicle-side controller 170 when the engine is in the on state, and the electrical loading is high, i.e., close to the power buffer. The message specifying the hold command, in one approach, is used when the engine is in the off state, which is typically a condition when the electrical loading is sensitive to the starter power load.

The evaluation module 220 may not receive a request for an increase to the electrical power delivery from the peripheral device 180, but may determine that the loading threshold is not being satisfied. The determination may be dynamic and regardless of any request for an increase to the electrical power delivery from the peripheral device 180. Accordingly, the evaluation module 220 may indicate to the communication module 230 to generate a downgrade message specifying a downgrade to the present electrical power delivery. The downgrade message may include a downgrade percentage having a percentage value that is zero percent or a percentage value that has a non-zero percentage. The downgrade percentage represents a percent decrease to the electrical power presently delivered to the peripheral device 180.

The peripheral device 180 may manage the electrical power delivery in response to receiving the downgrade message by reducing the power draw according to the downgrade percentage.

The evaluation module 220 may identify that the request from the peripheral device 180 is for a decrease to the electrical power presently delivered, as set forth above. Accordingly, in one arrangement, the communication module 230 includes instructions to, in response to identifying that the request from the peripheral device 180 is for the decrease to the electrical power delivery, communicate the message to initiate the decrease to the peripheral device 180 that reduces the electrical power delivery at a ramp-down rate. The request may include either a requested power value representative of the decrease to the electrical power, or an indication that the peripheral device 180 no longer requires power and wants to turn off, i.e., draw zero power.

It may be advantageous for the vehicle-side controller 170 to know when the peripheral device 180 wants to either draw less power, i.e., enter a lower power mode, or to shut itself off. For example, when managing multiple peripheral devices 180, the evaluation module 220 may be able to more quickly respond to adjusting the priority of the peripheral devices 180, a set forth above, when the peripheral device 180 announces it no longer requires power. Further, the evaluation module 220 may track the amount of power that is being drawn by the peripheral devices 180 more accurately by knowing when the decrease is occurring as opposed to inferring the decrease if the peripheral device 180 were to shut itself off unannounced.

When the request to modify the electrical power delivery to the peripheral device 180 is received by the evaluation module 220, as set forth above, the request may indicate the peripheral device 180 type as being purely resistive or inductive or a combination of both. The request may also indicate a resistance value and an inductance value that the evaluation module 220 may store in the thresholds database 260. For inductive type loads, the evaluation module 220 may determine the ramp-down rate that corresponds to a predetermined minimum level of kick-back energy from the inductance and resistance values of the peripheral device. The evaluation module 220 may store the ramp-down rate in the thresholds database 260. For purely resistive type loads, the communication module 230 may include a default ramp-down rate in the message indicative of a typical resistive load turn off time. By controlling the ramp-down rate, transients from abruptly switching off inductive loads may be reduced, thus reducing the negative impact that electrical transients have on the performance of electronic components.

Figure 3:
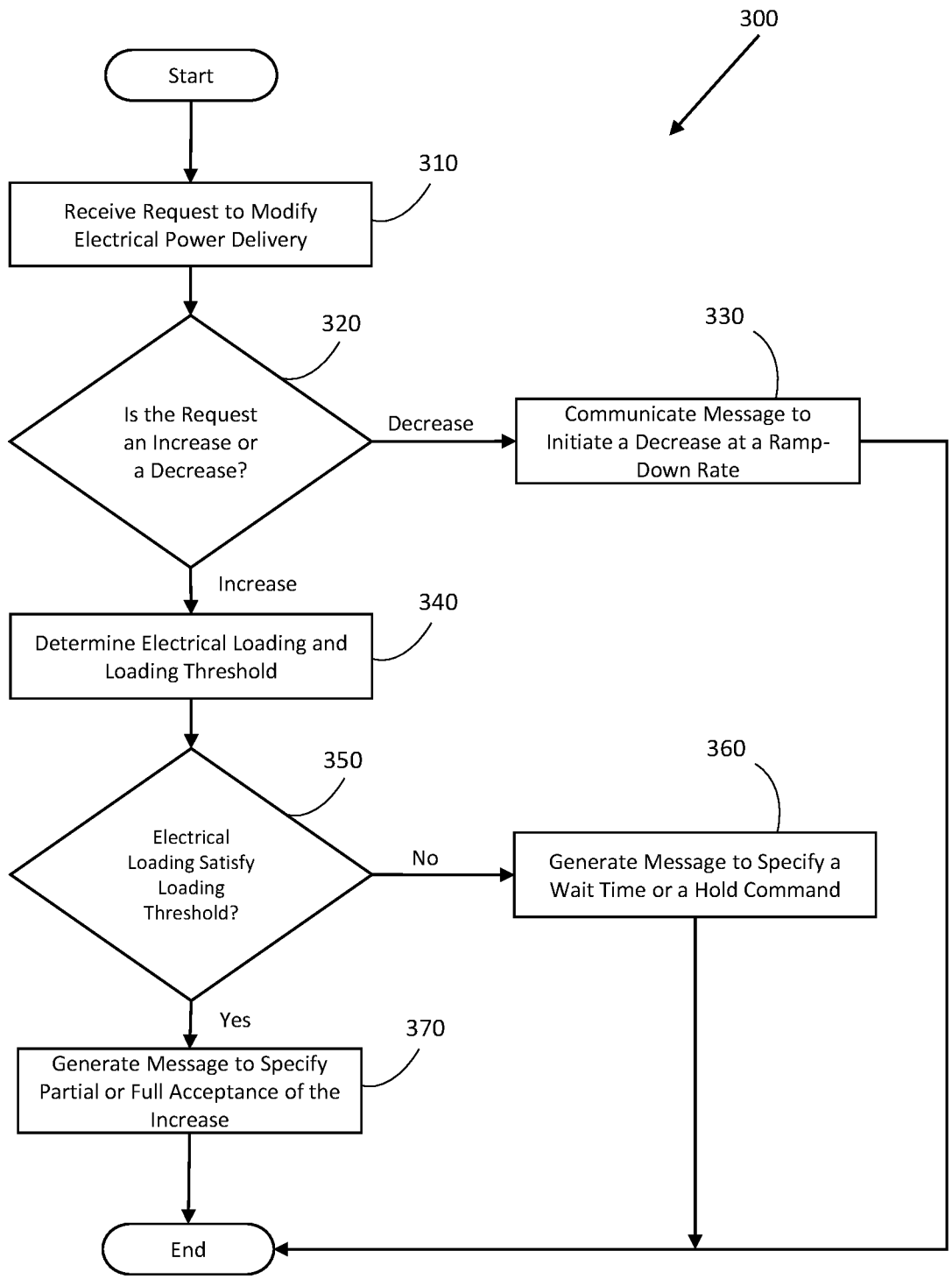
FIG. 3 illustrates one embodiment of a method associated with the managing electrical power delivery to the peripheral device from the perspective of the vehicle-side controller.

Additional aspects of managing electrical power delivery to a peripheral device 180 will be discussed in relation to FIG. 3. FIG. 3 illustrates a method 300 associated with managing electrical power delivery from the perspective of the vehicle-side controller 170 of FIGS. 1 and 2. While the method 300 is discussed in combination with the vehicle-side controller 170, it should be appreciated that the method 300 is not limited to being implemented within the vehicle-side controller 170 but is instead one example of a system that may implement the method 300.

At block 310, the evaluation module 220 monitors for a request from the peripheral device 180 to modify the electrical power delivery. The request is communicated to the evaluation module 220 over the communication channel 190. The communication channel 190 may be a wired medium (e.g., vehicle CAN bus), a wireless medium (e.g., Bluetooth) or an optical fiber medium. The request to modify the electrical power can include parameters specifying an increase or a decrease to the electrical power. The request may include a requested power value representative of the increase or the decrease to the electrical power presently drawn by the peripheral device. The request may indicate that the peripheral device 180 wants to turn off and draw zero power. The request may include the power time and whether the peripheral device 180 load is purely resistive or inductive or a combination of both.

At block 320, the evaluation module 220 identifies whether the request is for an increase or a decrease to the electrical power delivery to the peripheral device. The evaluation module 220 may store the associated information included with the request, as described above, in the data store 240 for continued access by the evaluation module 220 and the communication module 230.

At block 330, in response to the evaluation module 220 identifying that the request from the peripheral device 180 is for the decrease to the electrical power delivery, the communication module 230 communicates a message to the peripheral device 180 via the communication channel 190. The message indicates that the peripheral device 180 initiate a decrease to the electrical power drawn from the power delivery system 160 via the electrical power channel 195. The message also includes a ramp-down rate that specifies a time period over which the peripheral device 180 is to either ramp down the electrical power to the requested power value, or turn off by ramping down the electrical power to zero. The ramp-down rate may be determined by the evaluation module 220 for inductive load types, and a default ramp-down rate may be used for purely resistive loads.

At block 340, the evaluation module 220, in response to identifying that the request is for an increase to the electrical power delivery, determines the electrical loading of the power delivery system 160 and the loading threshold. The evaluation module 220 derives the electrical loading from the electrical power presently delivered to the electrical power consumers from the power delivery system 160. The evaluation module 220 uses the voltage and the current observations from the sensor data 119 associated with the power delivery system 160 to determine a present electrical power delivery level. In one arrangement, the evaluation module stores the present electrical power delivery level, which is representative of the electrical loading, in the thresholds database 260. In concert with the electrical loading determination, the evaluation module 220 determines the loading threshold. In one or more arrangements, the loading threshold is based at least in part on the electrical power limit and the engine being in the off state. To account for (e.g., the requested power value, variability in the requested power value, tolerances, etc.), the evaluation module 220 may use the power buffer value to provide a sufficient margin of power to the electrical power limit, as described above. The loading threshold determination may include the starter power load value when the engine is in the off state.

At block 350, the communication module 230 compares the present electrical loading with the loading threshold. In one arrangement, the communication module 230 generates a message to include particular content according to whether the electrical loading satisfies the loading threshold. The communication module 230 determines that the loading threshold is satisfied when the value of the present electrical loading has a power level greater than the loading threshold. The loading threshold may still be satisfied when the electrical threshold temporarily dips below the loading threshold, as described above. The loading threshold may be predictive on occasion when the engine is in the off state. That is, when the engine is in the off state, the power required by the starter may be added to the electrical power limit to reserve enough power to start the engine. Accordingly, if the peripheral device 180 were to request an increase to the electrical power delivery when the engine is in the off state, the chances of the electrical loading satisfying the loading threshold are reduced as compared to when the engine is on.

At block 360, due to the loading threshold not being satisfied, the communication module 230 generates the message to specify at least one of a wait time for requesting the increase again, and a hold command to wait until further notified to request the increase again. The communication module 230 communicates the message to the peripheral device 180 over the communication channel 190. The evaluation module 220 may determine the wait time and a notification time, as well as indicate to the communication module 230 that the message specifying the wait time or hold command be generated, as set forth above. In either case, the message specifying the wait time or the hold command causes the peripheral device 180 to respond by maintaining a present electrical loading from the power delivery system 160.

At block 370, due to the loading threshold being satisfied, the communication module 230 generates the message to specify at least one of a partial acceptance that a percentage of the increase is available, and a full acceptance of the increase is available. The communication module 230 communicates the message to the peripheral device 180 over the communication channel 190. The full acceptance can be thought of as the percentage of the increase being one hundred percent. The evaluation module 220 may determine the appropriate percentage to the requested power value that keeps the present electrical loading above the summation of the electrical power limit and the power buffer. The message specifying the partial acceptance or the full acceptance causes the peripheral device 180 to respond by executing the appropriate percentage of the requested power value from the power delivery system 160.

Figure 4:
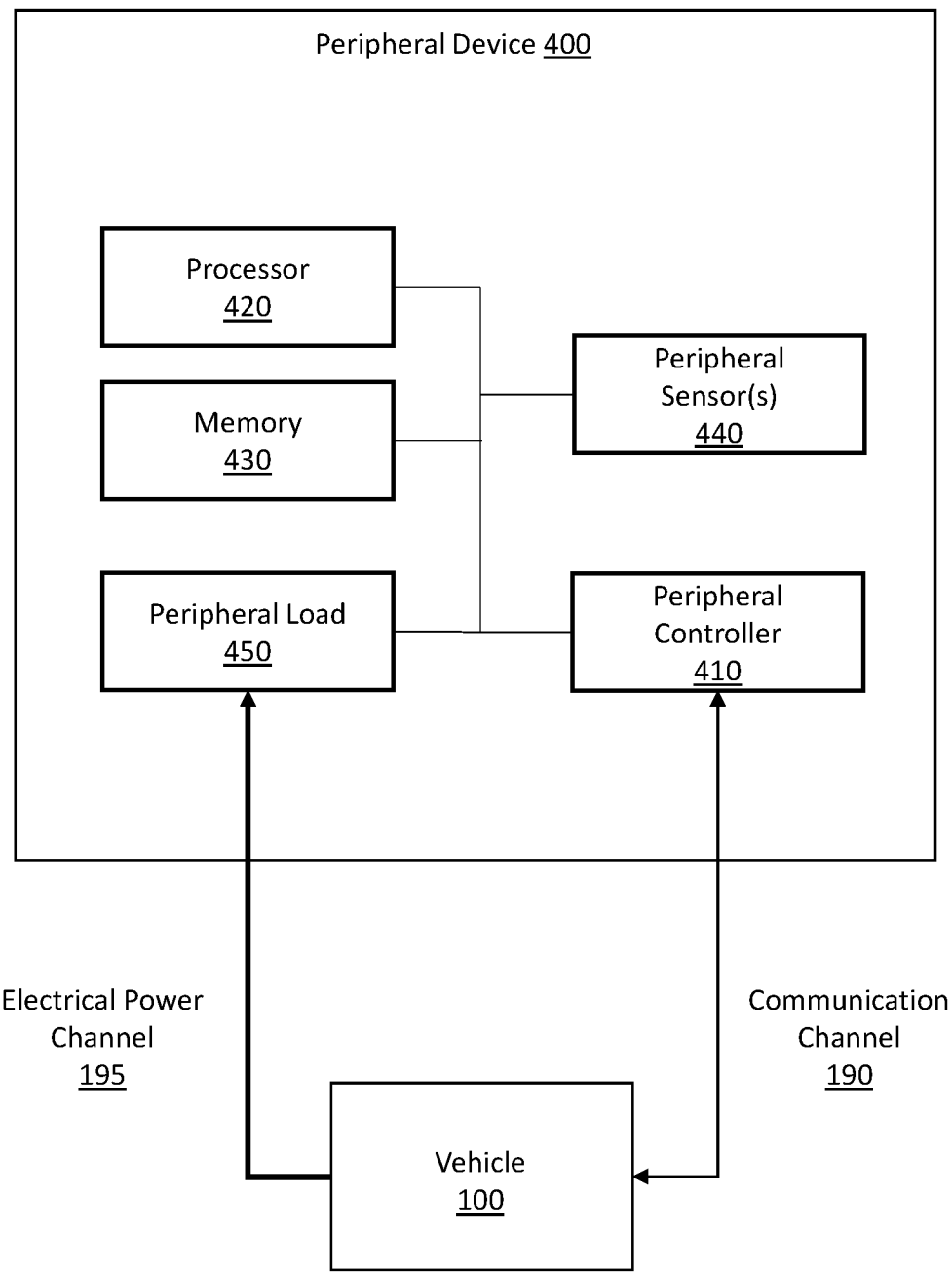
FIG. 4 illustrates one embodiment of a peripheral device in which example systems and methods disclosed herein may operate.

Referring to FIG. 4, an example peripheral device 400 is illustrated. In one implementation, the peripheral device 400 is connected to the vehicle 100 for managing electrical power delivery to the peripheral device 400. For example, the peripheral device 400 receives electrical power via the electrical power channel 195 (e.g., from the power delivery system 160) and communicates with the vehicle via the communication channel 190 (e.g., with the vehicle-side controller 170). The peripheral device 400 includes a peripheral controller 410 communicatively connected to the communication channel 190. The peripheral controller 410, in one or more arrangements, orchestrates the operation of the peripheral device 400 for requesting modifications to the electrical power delivery from the vehicle 100. With reference to FIG. 4, in relation to the peripheral controller 410, the peripheral device 400 is shown as including a processor 420 and memory 430 to which the peripheral controller 410 is communicatively connected. The processor 420, the memory 430 and the peripheral controller 410 together serve as a computing device whose peripheral controller 410 is employable to orchestrate the operation of the peripheral device 400.

The processor 420 is a component configured to execute the processes described herein with respect to the peripheral device 400 or instructions to carry out such processes or cause such processes to be performed. The processor 420 may be implemented with one or more general-purpose or special-purpose processors. Examples of a suitable processor 420 include microprocessors, microcontrollers, digital signal processors or other forms of circuitry that execute software. Other examples of a suitable processor 420 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor 420 may include at least one hardware circuit (e.g., an integrated circuit) configured to carry out instructions contained in program code. The peripheral device 400 may include more than one processor 420. In arrangements where there are multiple processors 420, the processors 420 may work independently from each other or in combination with one another.

The memory 430 is a non-transitory computer readable medium. The memory 430 may include volatile or nonvolatile memory, or both. Examples of suitable memory 430 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 430 includes stored instructions in program code. Such instructions are executable by the processor 420 or the peripheral controller 410. The memory 430 may be part of the processor 420 or the peripheral controller 410, or may be communicatively connected the processor 420 or the peripheral controller 410. The peripheral controller 410 may store data, e.g., peripheral sensor data, power attributes, etc., in the memory 430.

Generally speaking, the peripheral controller 410 includes instructions that may be executed by the processor 420. The peripheral controller 410 may be implemented as computer readable program code that, when executed by the processor 420, execute one or more of the processes described herein. Such computer readable program code may be stored on the memory 430. The peripheral controller 410 may be part of the processor 420, or may be communicatively connected to the processor 420.

With continued reference to FIG. 4, the peripheral device 400 includes one or more peripheral sensors 440. The peripheral sensor(s) 440 can detect information about the peripheral device. The peripheral sensor(s) 440 can sense a voltage and a current delivered to a peripheral load 450 of the peripheral device 400. Depending on the type of peripheral device 400, as set forth above, various peripheral sensor(s) 440 may be implemented on the peripheral device 400, e.g., temperature sensors, humidity sensors, accelerometers, a global position system (GPS), cameras, etc. However, it will be understood that the embodiments described herein are not limited to the particular peripheral sensor(s) 440 described.

The peripheral device 400 includes the peripheral load 450. The peripheral load 450 receives electrical power from the vehicle 100 via the electrical power channel 195. The peripheral controller 410 is communicatively coupled to the peripheral load 450, and the electrical power delivery to the peripheral load 450 is managed by the peripheral controller 410. The peripheral load 450 may include current limiting capabilities that allow the current to be controlled into the peripheral load 450 by the peripheral controller 410, for example, solid state switching devices, relays, contactors, etc. The peripheral sensor(s) 440 may be coupled to the peripheral load 450 to sense, for example, temperature, motion, etc., of the peripheral load 450. The peripheral device 400 may include more than one peripheral load 450.

When managing electrical power delivery to the peripheral device 400 connected with the power delivery system 160 in the vehicle 100, the peripheral controller 410, in one arrangement, first determines power attributes for operating the peripheral device 400. The power attributes include all the possible power inputs that the peripheral device 400 can accept to achieve a full range of capabilities of the peripheral device 400. To determine the present power attributes, the peripheral controller 410 identifies the present power input desires for the peripheral device 400 to achieve a specific capability. For example, the peripheral device 400 may want to enter, e.g., a low-power mode because a threshold was exceeded, a high-power mode to achieve a device setting, etc. As another example, the possible power inputs that a mini-refrigerator may have is between 0-100 Watts to achieve all the cooling modes it was designed for. The specific power attributes after the door of the refrigerator was briefly opened, for example, may be 100 Watts to engage the compressor to cool the interior down to the current setting. In other words, 100 Watts is identified as the present power input needed, i.e., desired, for the refrigerator to achieve the current setting. The power attributes may be stored in the memory 430.

The peripheral controller 410, in one arrangement, determines the current attributes of the electrical power being delivered to the peripheral device 400 over the power delivery system 160. The peripheral controller 410 generally includes instructions that function to control the processor 420 to acquire data inputs from the one or more peripheral sensors 440 and to store the data inputs in the memory 430. To determine the current attributes of the electrical power, the peripheral controller 410, in one arrangement, analyzes the stored data inputs to determine a voltage and a current being delivered to the peripheral device 400 at a current time. A value of the voltage and a value of the current at the current time would be considered the true current attributes of the electrical power being delivered to the peripheral device, i.e., peripheral load 450. The current attributes may also include other general attributes associated with the voltage and the current, such as frequency, metadata attached to the values (e.g., a flag or a wait timer), etc.

In one or more arrangements, the peripheral controller 410 transmits a signal to the vehicle 100, i.e., the vehicle-side controller 170, via the communication channel 190 requesting a modification to the current attributes as a function of the power attributes in relation to the current attributes. In other words, the peripheral controller 410 compares the power attributes, i.e., the identified power inputs desires for the peripheral device 400 to achieve a specific capability, to the current attributes. Based on this comparison, the peripheral controller 410 determines the modification to the current attributes that aligns the current attributes with the power attributes. The peripheral controller 410 then transmits the signal to the vehicle-side controller 170 requesting the modification to the current attributes. In one arrangement, the modification to the current attributes includes generating a request for one or more of an increase to the electrical power delivery, a decrease to the electrical power delivery, and terminating the electrical power delivery.

When the vehicle-side controller 170 receives the request to modify the current attributes, i.e., the electrical power delivery, from the peripheral controller 410, the vehicle-side controller 170 may prepare a response. The response may be a message, as set forth above, that depends on whether the request to modify the current attributes was identified by the vehicle-side controller 170 as an increase or a decrease to the current attributes. Referring back to FIG. 3, various messages may be communicated to the peripheral controller 410 depending upon whether the request to modify was identified as an increase, a decrease and whether the electrical loading of the vehicle 100 satisfies the loading threshold. The messages may indicate adjustment attributes to the requested modification to the current attributes. The messages may indicate that the vehicle-side controller 170 denied the requested modification to the current attributes. In this instance, the adjustment attributes include at least one of a wait time for requesting the modification again, and a hold command to wait until further notified to request the modification again. In one arrangement, the adjustment attributes include a percent change to the current attributes that is allowed to be modified at the current time. Additionally, the adjustment attributes may include a ramp-down rate, as set forth below.

Accordingly, in response to one or more communications from the vehicle-side controller 170 indicating adjustment attributes for selectively modifying the current attributes, in one arrangement, the peripheral controller 410, executes one or more power management functions that change the current attributes. In the case where the vehicle-side controller 170 selected to deny the modification to the current attributes, the peripheral controller 410, in one arrangement, maintains the current attributes according to the adjustment attributes. That is, the peripheral controller 410 maintains the current attributes, i.e., the voltage and the current, of the peripheral load 450 that is presently being commanded by the peripheral controller 410. The peripheral controller 410, for example, would adhere to the wait time or the hold command for requesting the modification again, as set forth in the adjustment attributes.

In the case where the vehicle-side controller 170 selects to allow at least a percentage of the modification, i.e., an increase, to the current attributes, the peripheral controller 410, in one arrangement, executes a percent change to the current attributes according to the adjustment attributes. That is, the peripheral controller 410 executes a change to the voltage and/or the current of the peripheral load 450 such that the percent change to the requested power value is realized. In the case of a full acceptance of the increase from the vehicle-side controller 170, the percent change would be one hundred percent. It should be appreciated that by executing the percent change to the current attributes, the peripheral controller 410 is effectively modifying the electrical loading of the power delivery system 160.

The peripheral controller 410 may receive an adjustment attribute from the vehicle-side controller 170 for ramping down the current attributes at a ramp-down rate in response to a request for a decrease to the current attributes, i.e., the electrical power delivery. The request for the decrease from the peripheral controller 410 can include a request to decrease the current attributes to a lower power value or to terminate the electrical power delivery. For example, the peripheral controller 410 may determine that the settings have changed on the peripheral device 400, and the power attributes to achieve the changed setting include a lower power mode or zero power. In this case, in one arrangement, the peripheral controller 410 modifies the voltage and/or the current of the peripheral load 450 over a period of time to adhere to the ramp-down rate.

Figure 5:
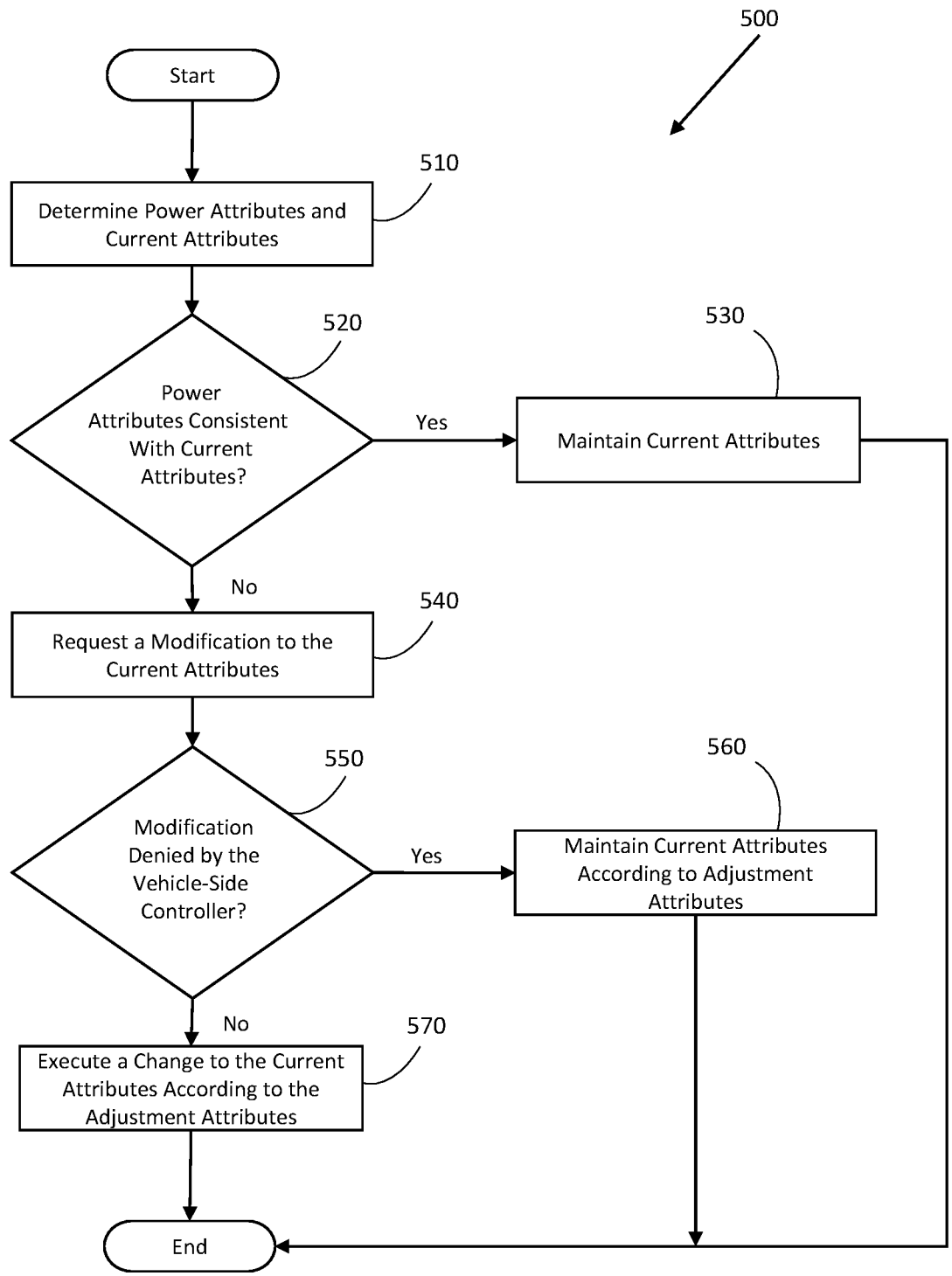
FIG. 5 illustrates one embodiment of a method associated with managing the electrical power delivery to the peripheral device from the perspective of a peripheral controller.

FIG. 5 illustrates a method 500 associated with managing electrical power delivery to a peripheral device 400 from the perspective of the peripheral controller 410 of FIG. 4. While the method 500 is discussed in combination with the peripheral controller 410, it should be appreciated that the method 500 is not limited to being implemented within the peripheral controller 410 but is instead one example of a system that may implement the method 500.

At block 510, the peripheral controller 410 determines the power attributes and the current attributes. The power attributes may be stored in the memory 430 as a lookup table that is indexed according to, for example, settings, power modes, type, etc. The peripheral controller 410 identifies the present power input desires for the peripheral device 400 to achieve a specific capability. For example, the desired power mode may be a low-power mode to sustain the current operation of the peripheral device 400. The peripheral device 400 may cross-reference the low-power mode to a specific voltage and a current from the lookup table. The peripheral controller 410 analyzes the data inputs obtained from the peripheral sensor(s) 440 stored in the memory 430 to determine a voltage and a current being delivered to the peripheral load 450 at a current time. The peripheral controller 410 assigns the voltage and the current at the current time to the current attributes.

At block 520, the peripheral controller 410 compares the power attributes with the current attributes to determine if the power attributes are consistent, i.e., equivalent, with the current attributes. When the power attributes differ from the current attributes, the current attributes may need to be modified to align with the identified present power input desires of the power attributes.

At block 530, the peripheral controller 410 maintains the current attributes determined from block 510. The voltage and the current currently being delivered to the peripheral load 450 is maintained by the peripheral controller 410. In other words, there is no change to the current attributes.

At block 540, the peripheral controller 410 determines whether the current attributes need to be increased or decreased to be in alignment with the power attributes. Accordingly, the peripheral controller 410 transmits a signal to the vehicle-side controller 170 via the communication channel 190 requesting a modification to the current attributes. Depending on the misalignment of the current attributes with the power attributes, the signal generated by the peripheral controller 410 may include a request for one or more of an increase to the electrical power delivery, a decrease to the electrical power delivery, and terminating the electrical power delivery.

At block 550, the vehicle-side controller 170 may respond back to the peripheral controller 410 indicating adjustment attributes for selectively modifying the current attributes. The response may be in the form of a message indicating adjustment attributes to the requested modification to the current attributes. The response may indicate whether the vehicle-side controller 170 selected to deny the modification At block 560, the peripheral controller 410 maintains the current attributes according the adjustment attributes. The peripheral controller 410 maintains the voltage and the current of the peripheral load 450 presently commanded by the peripheral controller 410. The peripheral controller 410 applies the adjustment attributes to the current attributes, i.e., the wait time or the hold command.

At block 570, the vehicle-side controller 170 allowed either the increase or the decrease to the current attributes, i.e., a change to the current attributes. In the case of the increase, the adjustment attributes may include a percent change to the current attributes that is allowed to be modified at the current time. The percent change may include one hundred percent of the requested power value. In the case of the decrease, the adjustment attributes may include a ramp-down rate. In either case, the peripheral controller 410 executes the change to the voltage and/or the current of the peripheral load 450 such that the requested modification occurs according to the adjustment attributes.

Figure 6:
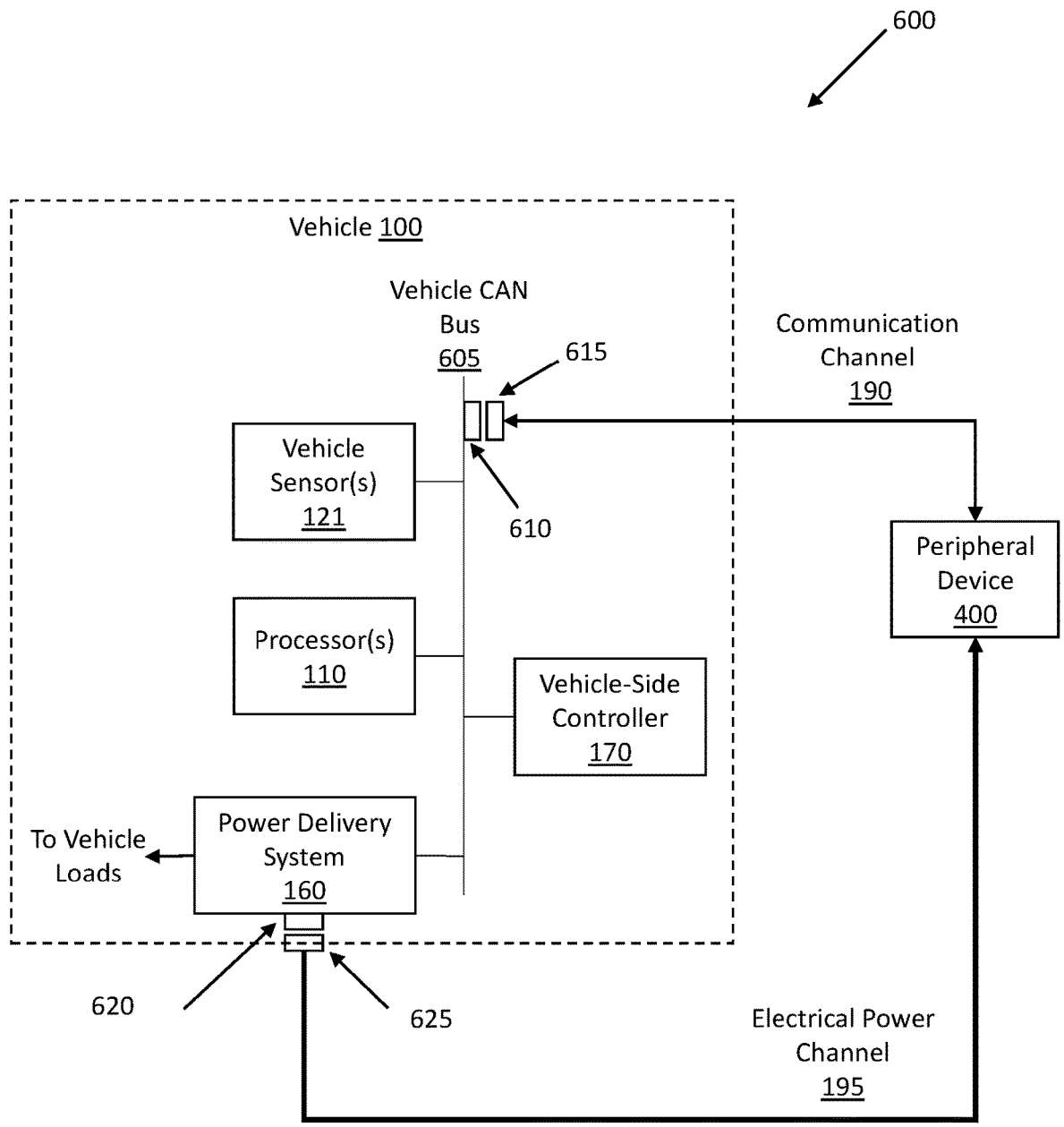
FIG. 6 is a diagram depicting the connection of the peripheral device to the vehicle.

FIG. 6 illustrates a diagram 600 depicting the connection of the peripheral device 400 to the vehicle 100. As illustrated, the peripheral device 400 is connected to a vehicle CAN bus 605 of the vehicle 100 via the communication channel 190. In the present example, the communication channel 190 is a wired medium, for example, a diagnostic cable, which terminates at an OBD connector 610 of the vehicle. The OBD connector 610 is, in one example, a 16-pin D-shaped female connector having a pinout defined by the Society of Automotive Engineers (SAE) J1962 standard. The diagnostic cable includes a mating connector 615 that is a male 16-pin D-shaped male connector. It should be appreciated that the peripheral device 400 may be connected to the vehicle CAN bus via the communication channel 190 utilizing a wireless medium (e.g., Bluetooth). The peripheral device 400 is also connected to the power delivery system 160 via the electrical power channel 195. The electrical power channel 195 is also a wired medium, for example, a two-wired cable, which terminates at a 120 VAC electrical outlet 620 of the vehicle 100. The two-wired cable includes a mating 120 VAC plug 625.

The vehicle-side controller 170 communicates via the diagnostic cable with the peripheral device 400 to manage electrical power delivery to the peripheral device 400. Vehicle sensor(s) 121 monitor a voltage and a current of the power delivery system 160, which is stored as sensor data 119 and used by the vehicle-side controller 170 to determine, for example, the electrical loading of the power delivery system 160. The power delivery system 160 supplies power to vehicle loads simultaneously with the peripheral device 400. The power delivery system may include various power sources/generation/converter devices, such as an alternator, a traction battery, DC/DC converter, etc.

Additionally, it should be appreciated that the vehicle-side controller from FIGS. 1 and 2 can be configured in various arrangements with separate integrated circuits and/or chips. In such embodiments, the evaluation module 220 is embodied as a separate integrated circuit. Additionally, the communication module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., the method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

The one or more data store(s) 115 can include sensor data (e.g., sensor data 119). In this context, "sensor data" means any information from the sensors that the vehicle 100 is equipped with, including the capabilities and other information about such sensors.

As noted above, the vehicle 100 can include a sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor(s) 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include the one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The vehicle 100 can include one or more actuators. The actuators can be any element or combination of elements operable to modify, adjust and/or alter one or more of the vehicle systems 150 or components thereof responsive to receiving signals or other inputs from the processor(s) 110. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, the one or more data stores 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. The module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle-side controller for managing electrical power delivery to a peripheral device in a vehicle, comprising:
one or more processors;
a memory communicably coupled to the one or more processors and storing:
an evaluation module including instructions that when executed by the one or more processors cause the one or more processors to:
receive, via a communication channel, a request from the peripheral device to modify the electrical power delivery to the peripheral device, and
in response to identifying that the request is for an increase to the electrical power delivery, determine an electrical loading of the vehicle; and
a communication module including instructions that when executed by the one or more processors cause the one or more processors to communicate a message over the communication channel to the peripheral device that causes the peripheral device to manage the electrical power delivery according to whether the electrical loading satisfies a loading threshold of the vehicle.

2. The vehicle-side controller of claim 1, wherein the evaluation module includes instructions to analyze observations of a voltage and a current of a power delivery system of the vehicle that is connected to the peripheral device, and
wherein the loading threshold is based at least in part on an electrical power limit of the power delivery system.

3. The vehicle-side controller of claim 1, wherein the evaluation module includes instructions to determine when an engine of the vehicle is in an off state, and
wherein the loading threshold is based at least in part on the engine being in the off state.

4. The vehicle-side controller of claim 1, wherein the communication module includes instructions to communicate the message including instructions to generate the message to specify at least one of a wait time for requesting the increase again, a hold command to wait until further notified to request the increase again, a partial acceptance that a percentage of the increase is available, and a full acceptance of the increase is available.

5. The vehicle-side controller of claim 1, wherein the communication module includes instructions to communicate the message to manage the electrical power delivery including instructions to cause the peripheral device to respond by one or more maintaining a present electrical loading from a power delivery system of the vehicle, and executing a percentage of the increase from the power delivery system.

6. The vehicle-side controller of claim 1, wherein the communication module further includes instructions to, in response to identifying that the request is for a decrease to the electrical power delivery, communicate the message to initiate the decrease to the peripheral device that reduces the electrical power delivery at a ramp-down rate.

7. The vehicle-side controller of claim 1, wherein the communication channel includes at least one of a wired medium, a wireless medium and a fiber-optic medium.

8. A method for managing electrical power delivery to a peripheral device in a vehicle from a vehicle-side controller, comprising:
receiving, at the vehicle-side controller via a communication channel, a request from the peripheral device to modify the electrical power delivery to the peripheral device;
in response to identifying that the request is for an increase to the electrical power delivery, determining an electrical loading of the vehicle; and
communicating a message over the communication channel to the peripheral device that causes the peripheral device to manage the electrical power delivery according to whether the electrical loading satisfies a loading threshold of the vehicle.

9. The method of claim 8, wherein evaluating the electrical loading includes analyzing observations of a voltage and a current of a power delivery system of the vehicle that is connected to the peripheral device, and
wherein the loading threshold is based at least in part on an electrical power limit of the power delivery system.

10. The method of claim 8, wherein evaluating the electrical loading includes determining when an engine of the vehicle is in an off state, and
wherein the loading threshold is based at least in part on the engine being in the off state.

11. The method of claim 8, wherein communicating the message includes generating the message to specify at least one of a wait time for requesting the increase again, a hold command to wait until further notified to request the increase again, a partial acceptance that a percentage of the increase is available, and a full acceptance of the increase is available.

12. The method of claim 8, wherein communicating the message to manage the electrical power delivery includes causing the peripheral device to respond by one or more maintaining a present electrical loading from a power delivery system of the vehicle and executing a percentage of the increase from the power delivery system.

13. The method of claim 8, further comprising:
in response to identifying that the request is for a decrease to the electrical power delivery, communicating the message to initiate the decrease to the peripheral device that reduces the electrical power delivery at a ramp-down rate.

14. The method of claim 8, wherein the communication channel includes at least one of a wired medium, a wireless medium and a fiber-optic medium.

15. A method for managing electrical power delivery to a peripheral device connected with a power delivery system in a vehicle, comprising:
determining power attributes for operating the peripheral device and current attributes of electrical power being delivered to the peripheral device over the power delivery system;
transmitting a signal to a vehicle-side controller over a communication channel requesting a modification to the current attributes as a function of the power attributes in relation to the current attributes; and
in response to one or more communications from the vehicle-side controller indicating adjustment attributes for selectively modifying the current attributes, executing one or more power management functions that change the current attributes.

16. The method of claim 15, wherein determining the current attributes includes analyzing sensor data from at least one sensor of the peripheral device to determine a voltage and a current delivered to the peripheral device at a current time.

17. The method of claim 15, wherein requesting the modification to the current attributes includes generating a request for one or more of: an increase to the electrical power delivery, a decrease to the electrical power delivery, and terminating the electrical power delivery.

18. The method of claim 15, wherein the adjustment attributes include at least one of a wait time for requesting the modification again, a hold command to wait until further notified to request the modification again, and a percent change to the current attributes that is allowed to be modified at the current time.

19. The method of claim 15, wherein executing the one or more power management functions includes one of maintaining the current attributes according to the adjustment attributes, and executing a percent change to the current attributes according to the adjustment attributes, and
  wherein executing the percent change to the current attributes includes modifying an electrical loading of the power delivery system.

20. The method of claim 19, further comprising:
  modifying the electrical loading at a ramp-down rate when a request for modification to the current attributes is for one or more of a decrease to the electrical power delivery, and terminating the electrical power delivery.

* * * * *